US006983919B2

(12) United States Patent
Kroggel

(10) Patent No.: US 6,983,919 B2
(45) Date of Patent: Jan. 10, 2006

(54) ADJUSTABLE DISPLAY DEVICE FOR COMPUTER MONITORS

(75) Inventor: Scott A. Kroggel, Garner, NC (US)

(73) Assignee: Adstracts, Inc., Raleigh, NC (US)

( * ) Notice: Subject to any disclaimer, the term of this patent is extended or adjusted under 35 U.S.C. 154(b) by 0 days.

(21) Appl. No.: 10/812,374

(22) Filed: Mar. 29, 2004

(65) Prior Publication Data

US 2005/0211864 A1  Sep. 29, 2005

(51) Int. Cl.
    *B41J 11/02*  (2006.01)
(52) U.S. Cl. ............ 248/442.2; 434/415; 434/417
(58) Field of Classification Search ........... 248/442.2, 248/454, 447, 447.2, 918; 434/408, 414, 434/415, 417, 419
See application file for complete search history.

(56) References Cited

U.S. PATENT DOCUMENTS

| | | | | |
|---|---|---|---|---|
| 4,960,257 A | * | 10/1990 | Waters .................... | 248/442.2 |
| 5,035,392 A | * | 7/1991 | Gross et al. ............. | 248/442.2 |
| 5,104,087 A | | 4/1992 | Wentzloff et al. ........ | 248/442.2 |
| 5,122,941 A | * | 6/1992 | Gross et al. ............. | 362/276 |
| 5,292,099 A | * | 3/1994 | Isham et al. ............. | 248/442.2 |
| 5,328,145 A | | 7/1994 | Charapich ................ | 248/442.2 |
| 5,398,905 A | | 3/1995 | Hinson .................... | 248/442.2 |
| 5,638,096 A | * | 6/1997 | Schwartz ................. | 248/442.2 |
| 5,988,582 A | | 11/1999 | Olivo ...................... | 248/442.2 |
| 6,290,200 B1 | * | 9/2001 | Ko .......................... | 248/442.2 |
| 6,295,038 B1 | * | 9/2001 | Rebeske .................. | 345/1.1 |
| 6,412,744 B1 | | 7/2002 | Wollam et al. ........... | 248/442.2 |
| 6,443,415 B1 | | 9/2002 | Sundblad ................. | 248/442.2 |
| 6,543,167 B1 | * | 4/2003 | Dwyer ..................... | 40/275 |

* cited by examiner

Primary Examiner—Ramon O Ramirez
(74) Attorney, Agent, or Firm—Myers Bigel Sibley & Sajovec

(57) ABSTRACT

An adjustable display device for computer monitors includes a pair of panels that are slidably connected together such that the display device has a compact configuration and a plurality of extended configurations. The slidability of the panels allows the display device to be adjusted to fit computer monitors of any size. The display device is supported on a computer monitor by a pair of hinges, one extending from each respective panel. The hinges allow the display device to rotate between stored and operative positions relative to the monitor.

30 Claims, 8 Drawing Sheets

US 6,983,919 B2

ADJUSTABLE DISPLAY DEVICE FOR COMPUTER MONITORS

FIELD OF THE INVENTION

The present invention relates generally to computer monitors and, more particularly, to displays attached to computer monitors.

BACKGROUND OF THE INVENTION

The use of promotional items has proliferated in today's increasingly competitive marketplace, where companies are constantly seeking more effective and new ways to market their products. In the healthcare industry, physicians and other healthcare providers often receive promotional articles from vendors of healthcare-related products, such as pharmaceutical products. These promotional articles often include "everyday" items, such as writing pads, calendars, and pens that have promotional information (indicia) printed thereon. For example, pharmaceutical companies often provide physicians with writing pens having the name of a particular pharmaceutical product printed thereon with the hopes that the pens will help remind the physicians to prescribe the particular pharmaceutical product.

Unfortunately, because of lack of distinctiveness, many promotional articles provided to healthcare providers often become "lost-in-the-shuffle" with other promotional articles. Thus, there is a need for distinctive, more effective promotional products directed to healthcare providers as well as to others.

SUMMARY OF THE INVENTION

In view of the above discussion, adjustable display devices for computer monitors include a pair of panels that are slidably connected together such that the display device has a compact configuration and a plurality of extended configurations. The slidability of the panels allows the display device to be adjusted to fit computer monitors of any size.

According to embodiments of the present invention, the display device is configured to be supported on a computer monitor by a pair of hinges, one extending from each respective panel. The hinges allow the display device to rotate between stored and operative positions relative to the monitor. According to an embodiment of the present invention, one of the hinges is configured to releasably lock the display device in an operative position.

According to embodiments of the present invention, one or both panels may include a writing surface, such as a whiteboard. Alternatively, one or both panels may include a corkboard to which articles can be attached. Alternatively, one panel may include a writing surface, such as a whiteboard, and the other panel may include a corkboard.

According to embodiments of the present invention, promotional indicia is provided on at least one of the panels. A writing implement holder with a writing implement removably secured within the writing implement holder may be provided. In addition, an eraser may be removably secured to the display device.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF THE INVENTION

Figure 1:
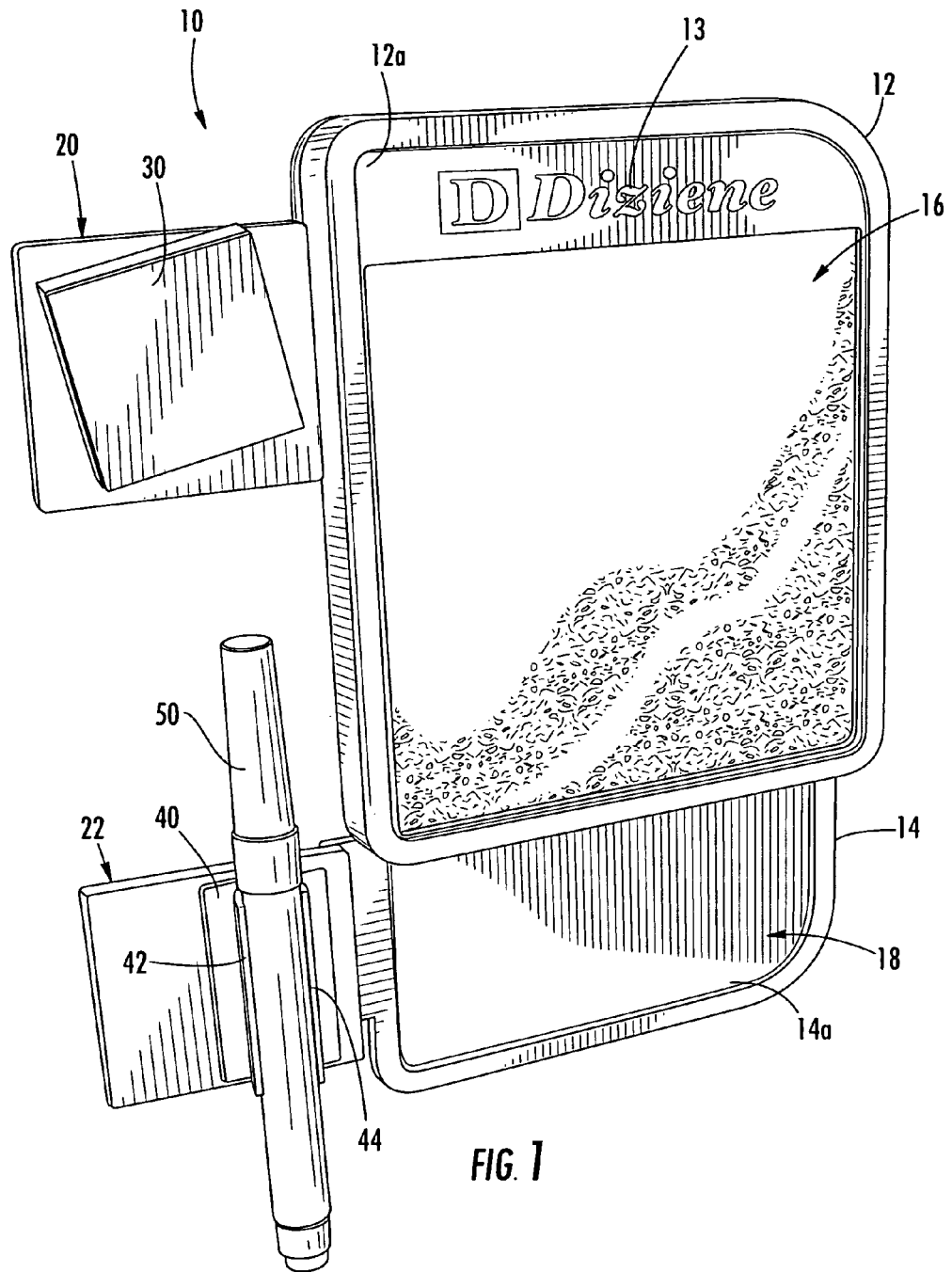
FIG. 1 is a front perspective view of a display device, according to an embodiment of the present invention, and wherein the slidable panels are in a retracted configuration.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present.

The terms "upwardly", "downwardly", "vertical", "horizontal" and the like are used herein for the purpose of explanation only.

As used herein, the term "and/or" includes any and all combinations of one or more of the associated listed items.

Referring now to FIG. 1, an adjustable display device 10 for a computer monitor, according to an embodiment of the present invention, is illustrated. The illustrated display device 10 includes a pair of panels 12, 14 that are slidably connected together in telescoping arrangement. The panels 12, 14 are slidable relative to one another such that the display device 10 has a compact configuration and a plurality of extended configurations. Accordingly, the display device 10 can be adapted to fit virtually any computer monitor, regardless of size.

In the illustrated embodiment, panel 12 of the display device 10 includes a surface 12a having a corkboard 16 thereon and to which various items can be removably attached via push pins, thumbtacks, etc. Corkboards and the use thereof are well known in the art and need not be described further herein. Embodiments of the present invention may utilize corkboard having any shape, size or configuration. Moreover, a corkboard 16 may be provided on either or both of the panels 12, 14, according to embodiments of the present invention. Embodiments of the present invention are not limited to a single corkboard 16 on panel 12. In addition, various equivalents of a corkboard may be utilized including, but limited to, wood, plastic and other materials configured to removably receive thumbtacks, push pins, etc.

In the illustrated embodiment, panel 14 of the display device 10 includes a surface 14a having a writing surface 18 disposed thereon. Exemplary writing surfaces may include a white board, a chalk board, etc. Embodiments of the present invention may utilize a writing surface 18 having any shape, size or configuration. Moreover, a writing surface 18 may be provided on either or both of the panels 12, 14, according to embodiments of the present invention. Embodiments of the present invention are not limited to a single writing surface 18 disposed on panel 14.

In the illustrated embodiment, panel 12 includes promotional indicia 13 disposed thereon. However, promotional indicia may be disposed on the display device 10 at various locations (e.g., on panel 14, on hinge supports 20, 22, on corkboard 16 and/or on writing surface 18), without limitation. Various types of promotional indicia including, but not limited to, lettering, designs, characters, logos and other symbols, may be utilized in accordance with embodiments of the present invention. The term "lettering" as used herein includes, but is not limited to, alphabetical characters and alphanumeric characters.

Figure 5:
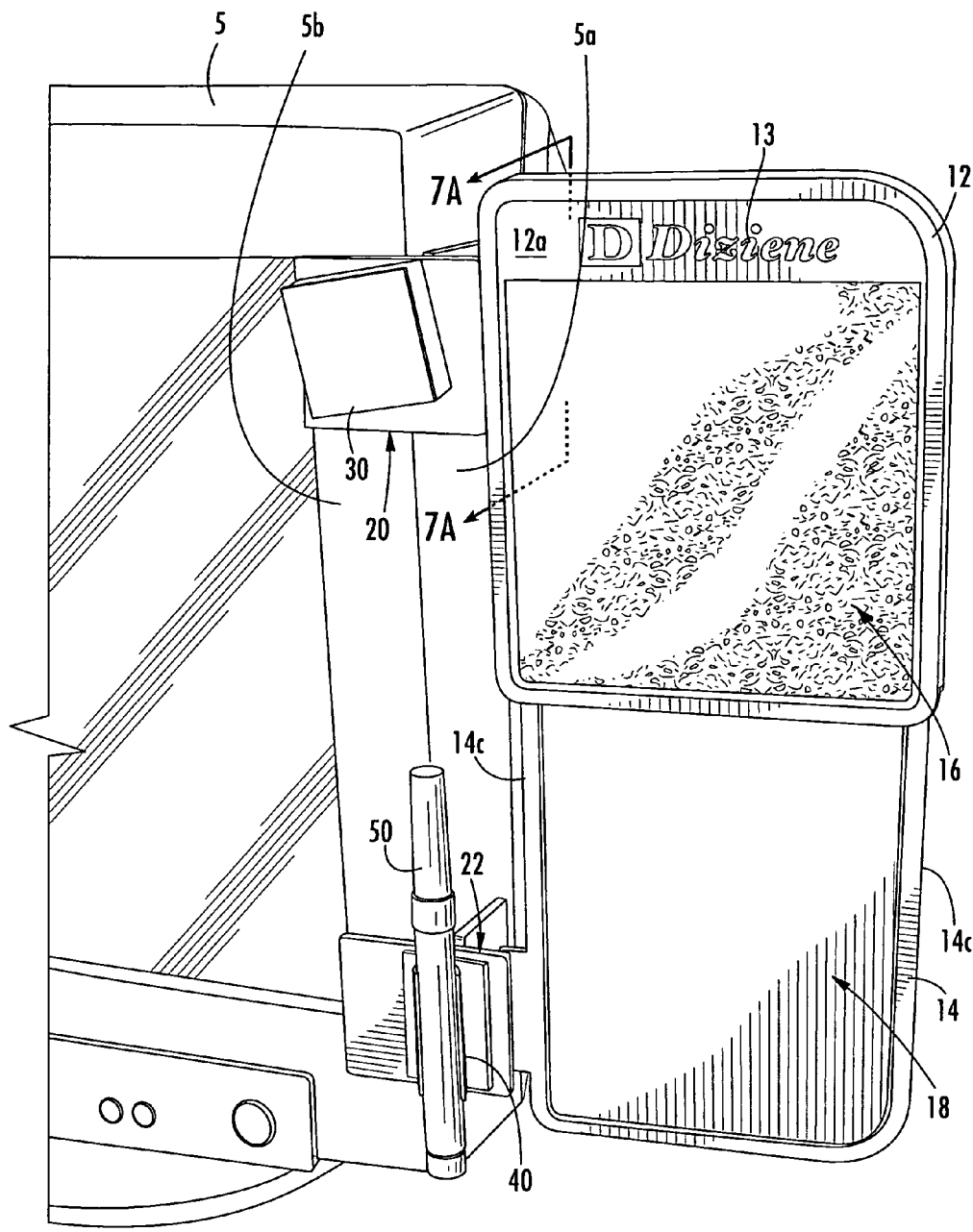
FIG. 5 is a front perspective view of the display device of FIG. 1, wherein the display device is attached to a computer monitor and is in an operative position.
Figure 6:
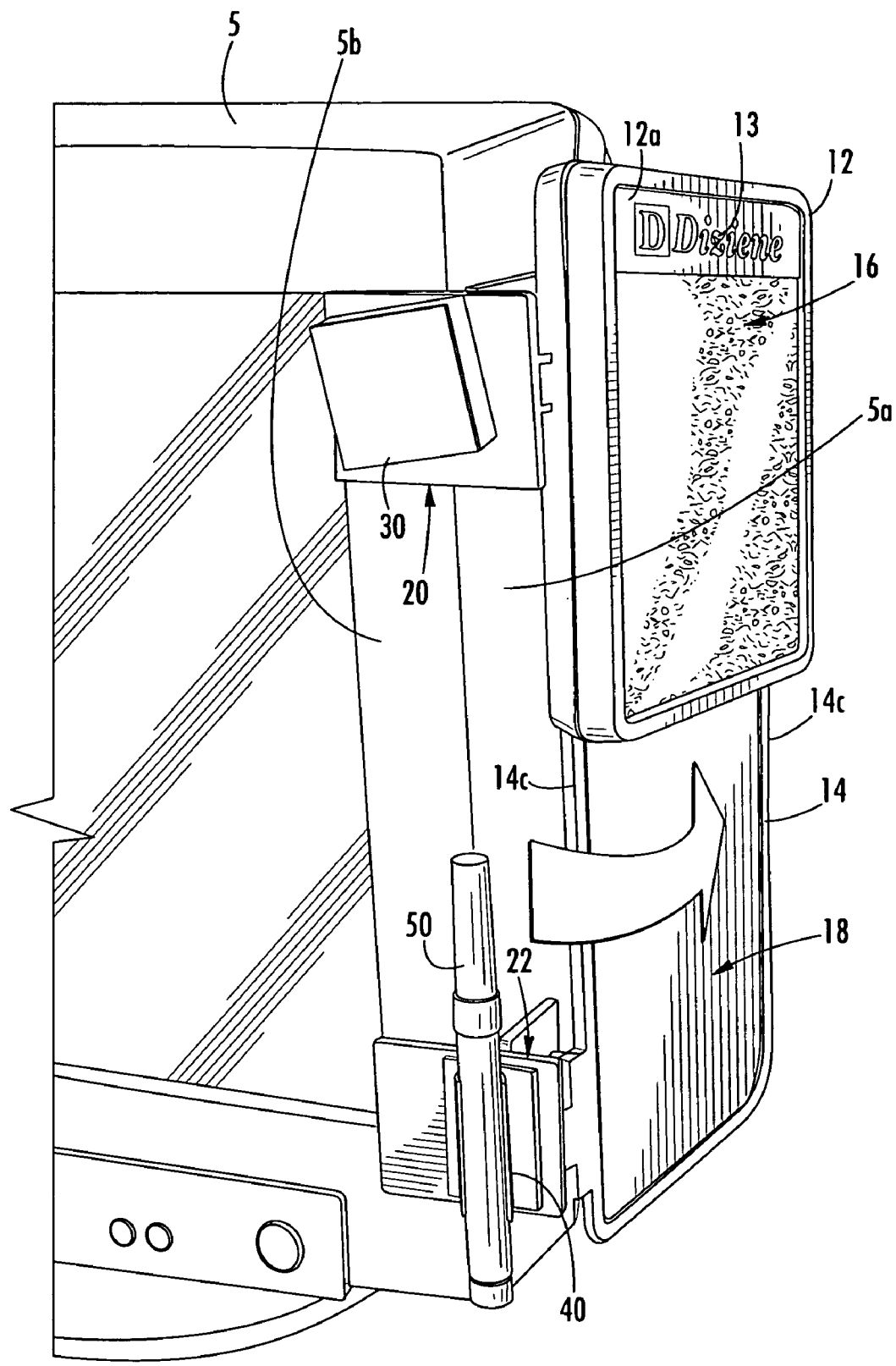
FIG. 6 is a front perspective view of the display device of FIG. 1, wherein the display device is attached to a computer monitor and is a stored position.

In the illustrated embodiment, a pair of hinge supports 20, 22 are configured to pivotally attach the display device to a computer monitor. Upper hinge support 20 extends from panel 12 and lower hinge support 22 extends from panel 14. The hinge supports 20, 22 allow the display device 10 to pivot between stored and operative positions relative to a computer monitor to which the display device 10 is attached. FIG. 5 illustrates the display device 10 attached to a computer monitor 5 in an operative position. FIG. 6 illustrates the display device 10 pivoted to a stored position relative to the computer monitor 5.

Embodiments of the present invention are not limited to the use of hinge supports. Non-pivoting supports may also be utilized to secure the display device 10 to a computer monitor.

In the illustrated embodiment, an eraser 30 is removably secured to upper hinge support 20 of the display device 10. The eraser 30 is configured to erase writing from the writing surface 18, and may be a whiteboard eraser, a chalkboard eraser, etc. The eraser 30 may be removably secured to the support 20 in various ways. For example, a hook and loop fastener system may be utilized. Moreover, the eraser 30 may be removably secured to other portions of the display device 10, including panels 12, 14 and lower hinge support 22.

In the illustrated embodiment, a writing implement holder 40 is attached to lower hinge support 22 of the display device 10. The writing implement holder 40 includes a pair of arms 42, 44 that extend outwardly in spaced-apart relationship and that are configured to removably receive a writing implement 50 disposed therebetween. The writing implement holder 40 may be secured to the lower hinge support 22 in various ways. Moreover, the writing implement holder 40 may be secured to other portions of the display device 10, including panels 12, 14 and upper hinge support 22.

Figure 2:
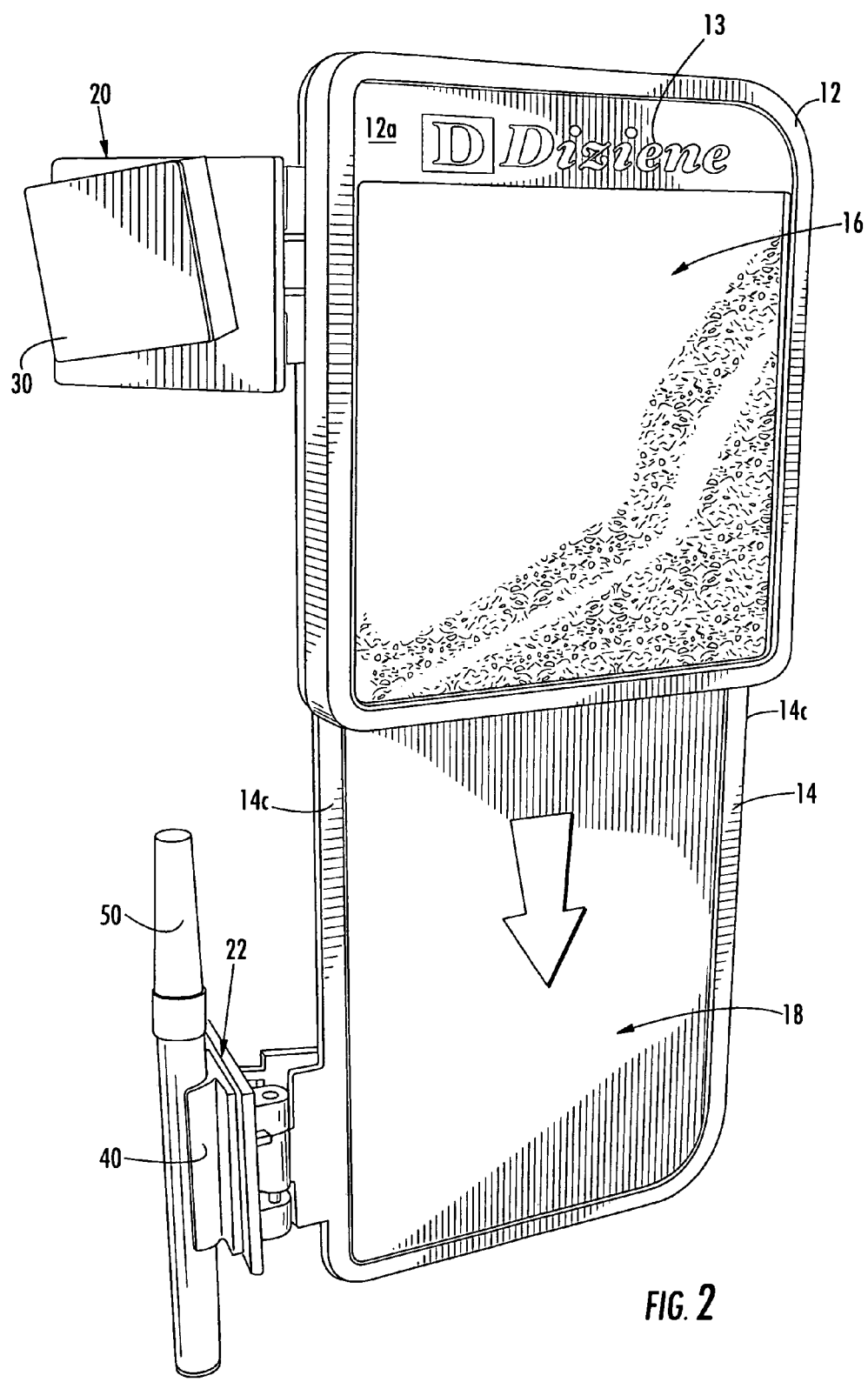
FIG. 2 illustrates the display device of FIG. 1 wherein the slidable panels are in an extended configuration.
Figure 3:
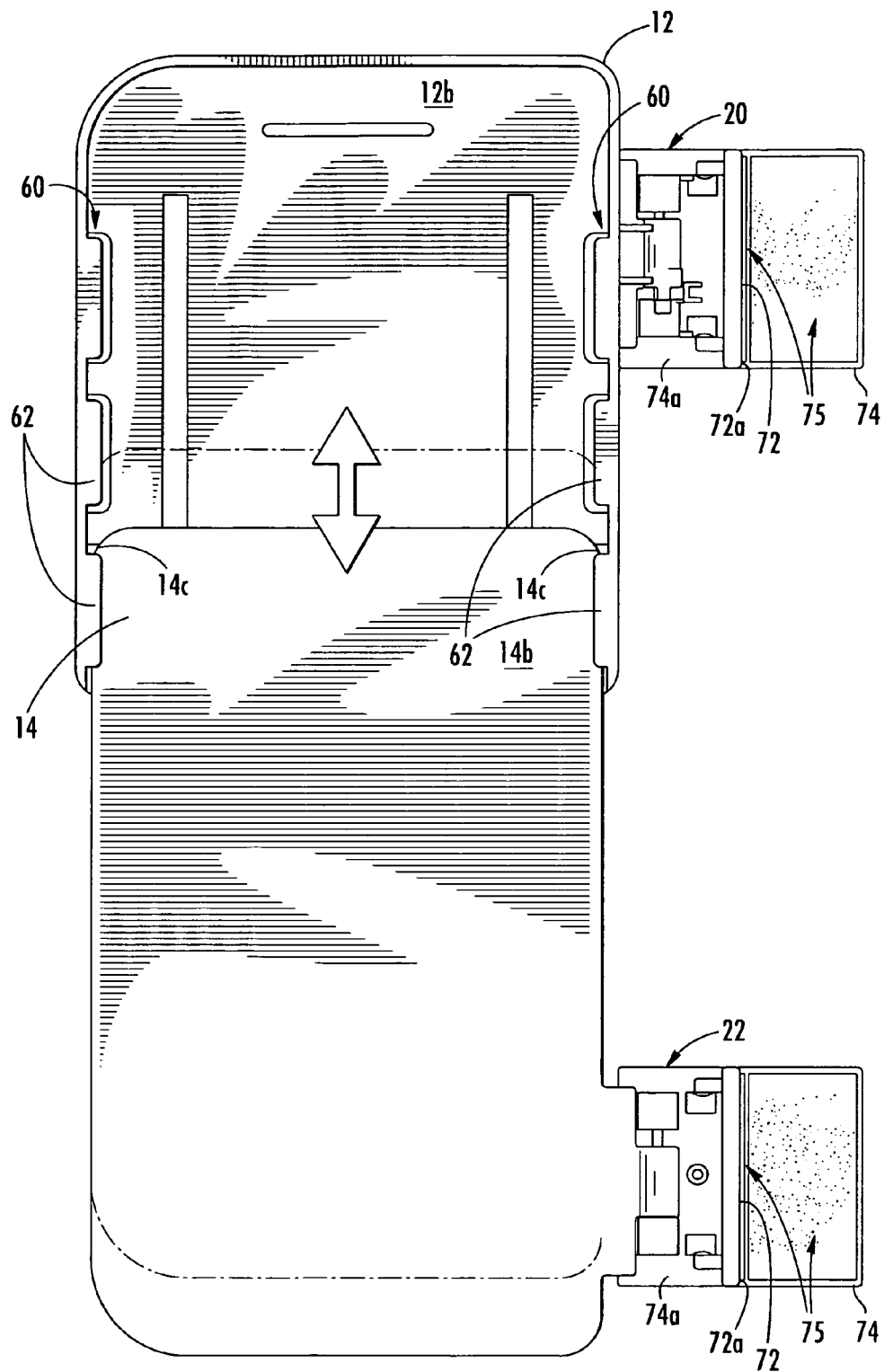
FIG. 3 is a rear perspective view of the display device of FIG. 1.

Panels 12, 14 are slidably connected in telescoping arrangement such that the display device 10 can be "lengthened", as illustrated in FIG. 2, and "shortened", as illustrated in FIG. 1. The slidability of the panels 12, 14 allows the display device to be adjusted to fit any size computer monitor that the display device 10 is to be attached to. As illustrated in FIG. 3, panel 12 has guides 60 formed in the rear portion 12b thereof. The side edges 14c of panel 14 are slidably disposed within the guide slots 60 to permit slidable movement of the panels 12, 14 relative to one another. Tabs 62 are provided to maintain panel 14 within the guides 60.

Figure 4:
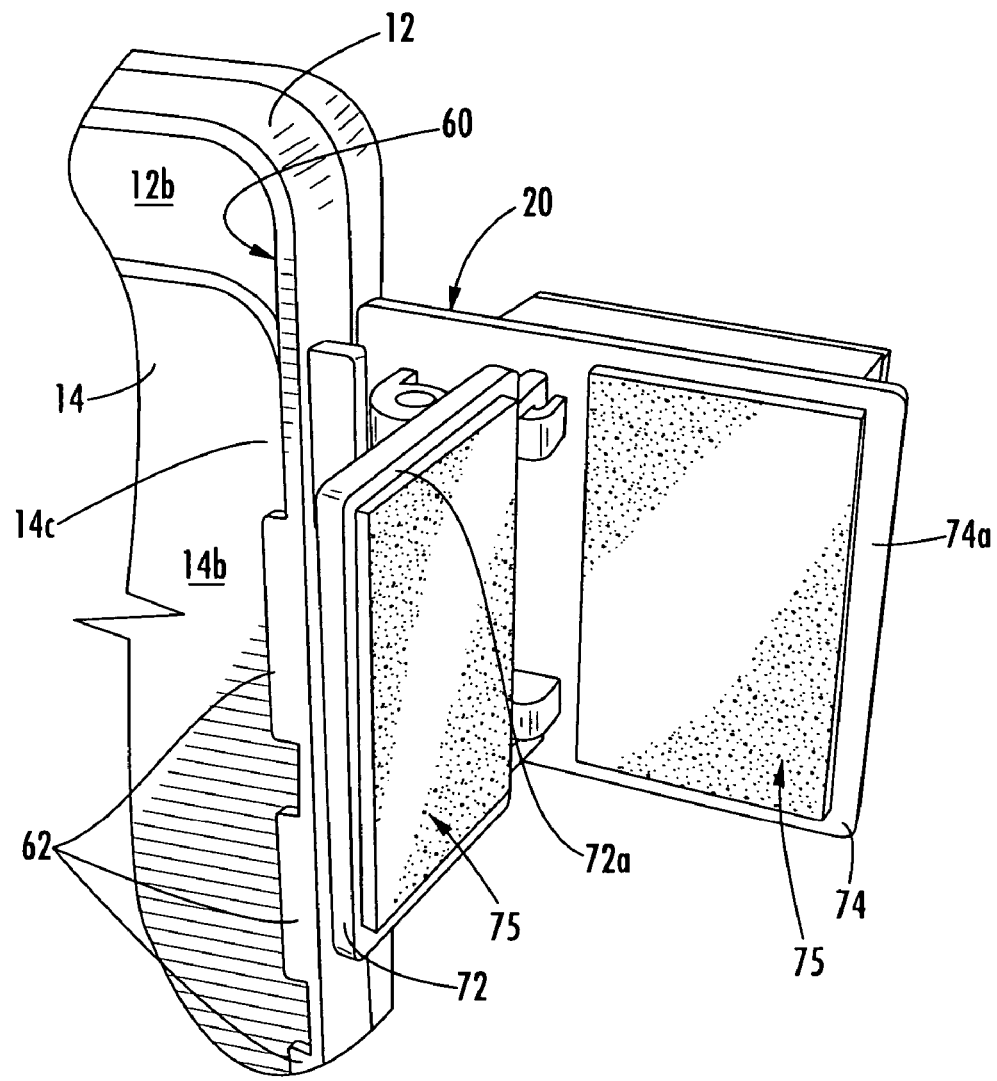
FIG. 4 is a partial rear perspective view of the display device of FIG. 1 that illustrates the upper hinge support.

Referring to FIG. 4, upper hinge support 20 is illustrated and includes first and second wing portions 72, 74. Adhesive material 75 is disposed on surfaces 72a, 74a of the first and second wing portions 72, 74, respectively, as illustrated. The adhesive material is configured to adhesively secure the display device 10 to a computer monitor. The first wing portion 72 is configured to be attached to a side portion 5a of a computer monitor 5 and the second wing portion 74 is attached to a front portion 5b of a computer monitor 5, as illustrated in FIG. 5. Lower hinge support 22 also includes first and second wing portions 72, 74 that are configured to be attached to the side portion 5a and front portion 5b of the computer monitor, respectively.

Figure 7A:
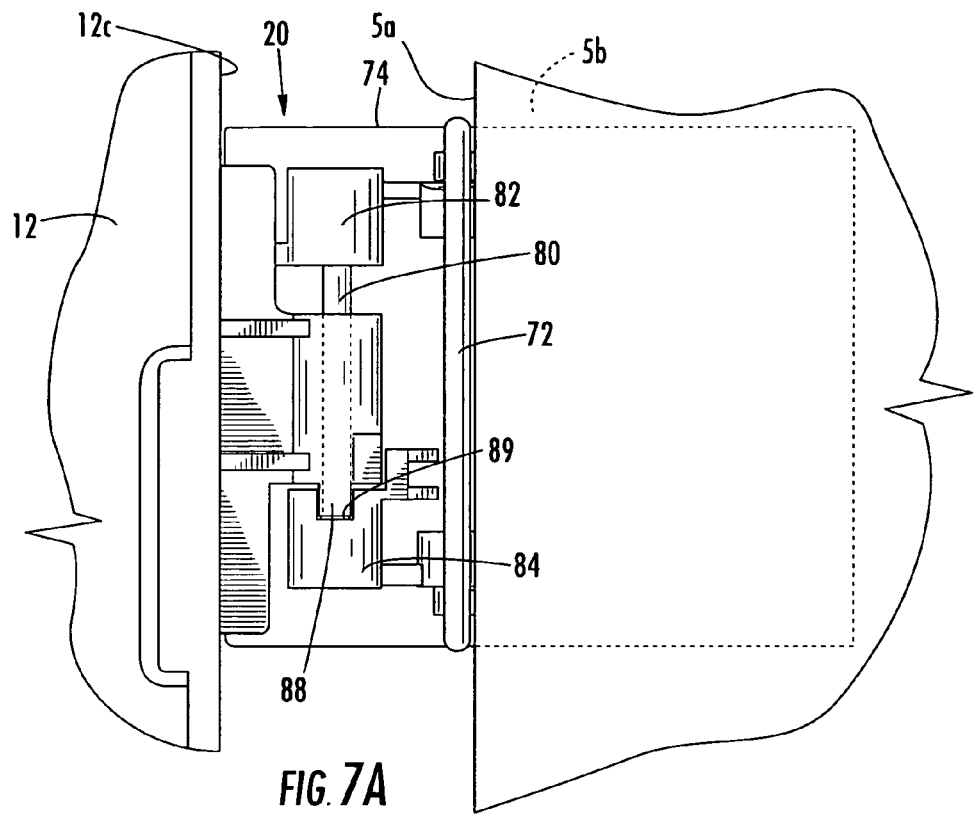
FIG. 7A is a cross-sectional view of the display device of FIG. 5 taken along lines 7A–7A and that illustrates upper hinge support.
Figure 7B:
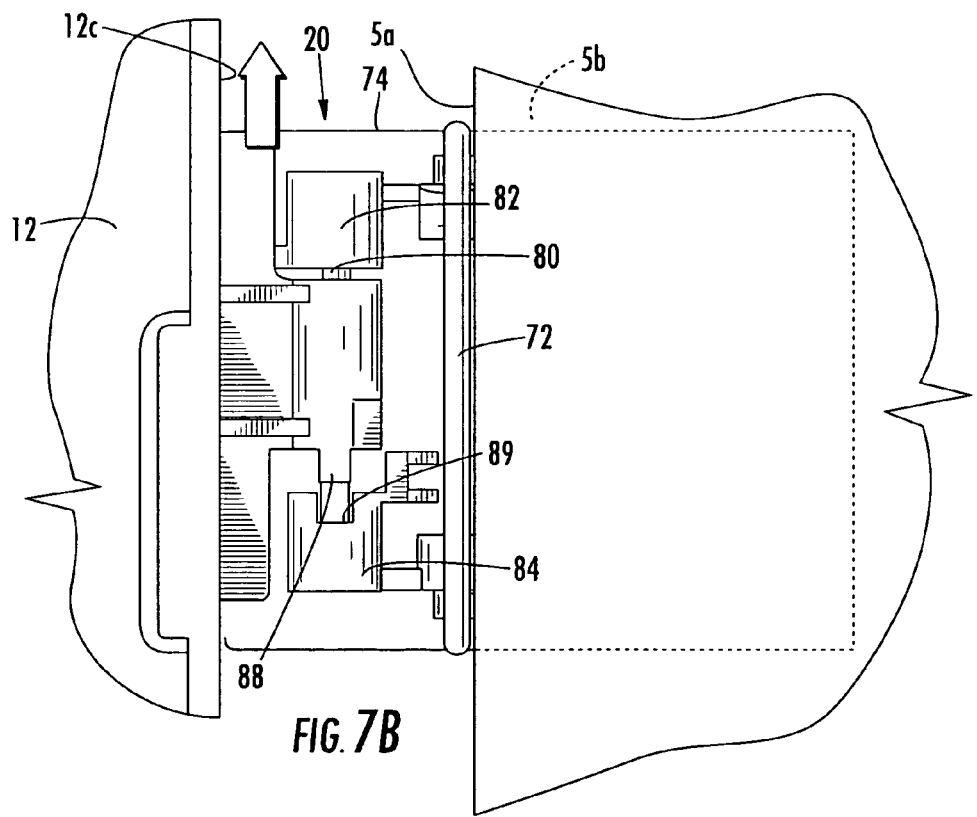
FIGS. 7B–7C illustrate operation of the hinge support of FIG. 7A.
Figure 7C:
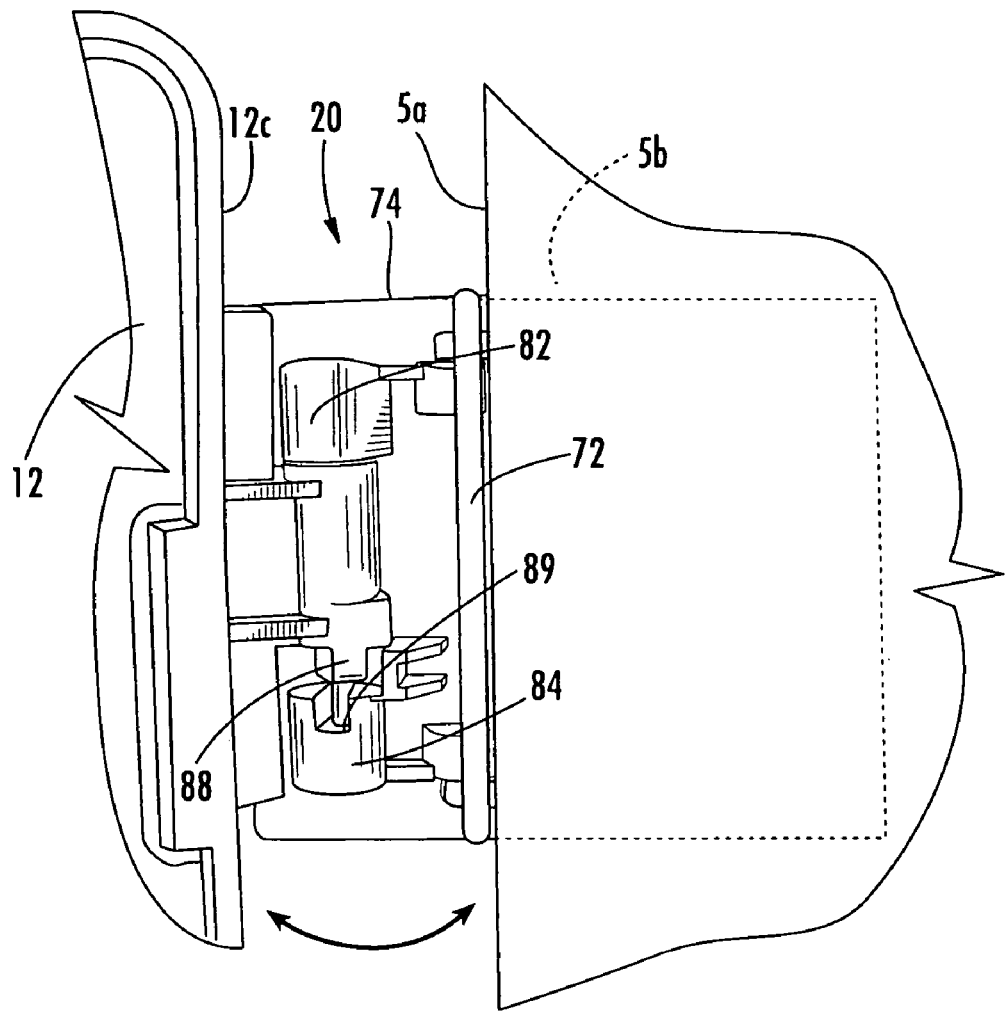

Referring now to FIGS. 7A–7C, the illustrated upper hinge support 20 is configured to releasably lock the display device 10 in an operative position. Upper hinge support 20 includes a hinge pin 80 that is fixedly secured between supports 82, 84. Supports 82, 84 are fixedly secured to the second wing portion 74. A locking member 86 extends from an edge portion 12c of panel 12. Locking member 86 has n axial bore 87 extending therethrough, as illustrated. Hinge pin 80 is disposed within the axial bore 87, such that locking member 86 and panels 12, 14 can pivot about hinge pin 80. It is understood, but not illustrated, that the lower hinge support 22 includes a similar arrangement that permits pivotal movement.

The locking member 86 includes a tab 88 that extends downwardly from a lower portion thereof, as illustrated. Tab 88 is configured to engage a slot 89 formed in support 84 when the display device 10 is in an operative position. The engagement of tab 88 in slot 89 prevents the display device from being moved inadvertently from the operative position (FIG. 5).

When it is desired to move the display device 10 to a stored position, the panel 12 is lifted upwardly slightly such that tab 88 becomes disengaged from the slot 89. The locking member 86, panel 12 (and panel 14 attached thereto) can be pivoted about hinge pin 80 to a stored position (FIG. 7C).

The illustrated lower hinge support 22 does not include a locking feature, but could, according to other embodiments of the present invention.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. The invention is defined by the following claims, with equivalents of the claims to be included therein.

That which is claimed is:

1. An adjustable display device for a computer monitor, comprising:

a pair of panels slidably connected together in overlapping telescoping arrangement, wherein the panels are slidable relative to one another such that the display device has a compact configuration and one or more extended configurations;

wherein one of the panels comprises a writing surface; and a support extending from at least one of the panels that is configured to attach the display device to a computer monitor.

2. The display device of claim 1, wherein the other panel comprises a corkboard.

3. The display device of claim 1, wherein the other panel comprises a writing surface.

4. The display device of claim 1, wherein the writing surface comprises a whiteboard.

5. The display device of claim 1, wherein the support comprises a pair of supports, each support extending from a respective panel.

6. The display device of claim 1, wherein the support comprises a hinge that allows the display device to pivot between stored and operative positions relative to the monitor.

7. The display device of claim 6, wherein the hinge is configured to releasably lock the display device in an operative position.

8. The display device of claim 1, further comprising promotional indicia on at least one of the panels.

9. The display device of claim 1, further comprising a writing implement holder attached thereto.

10. The display device of claim 9, wherein the writing implement holder comprises a pair of arms extending outwardly from the display device, wherein the arms are spaced apart from each other for snugly receiving a writing implement therebetween.

11. The display device of claim 1, further comprising a writing implement removably secured within the writing implement holder.

12. The display device of claim 1, further comprising an eraser removably secured to the display device, wherein the eraser is configured to erase writing from the writing surface.

13. The display device of claim 1, wherein one of the panels comprises opposing guides extending from a rear surface thereof, and wherein the other panel is slidably secured within the guides.

14. An adjustable display device for a computer monitor, comprising:

a pair of panels slidably connected together in overlapping telescoping arrangement, wherein the panels are slidable relative to one another such that the display device has a compact configuration and one or more extended configurations;

wherein one of the panels comprises a corkboard; and a support extending from one of the panels that is configured to attach the display device to a monitor.

15. The display device of claim 14, wherein the other panel comprises a corkboard.

16. The display device of claim 14, wherein the support comprises a pair of supports, each support extending from a respective panel.

17. The display device of claim 14, wherein the support comprises a hinge that allows the display device to pivot between stored and operative positions relative to the monitor.

18. The display device of claim 17, wherein the hinge is configured to releasably lock the display device in an operative position.

19. The display device of claim 14, further comprising promotional indicia on at least one of the panels.

20. The display device of claim 14, wherein one of the panels comprises opposing guides extending from a rear surface thereof, and wherein the other panel is slidably secured within the guides.

21. An adjustable display device for a computer monitor, comprising:

a pair of panels slidably connected together in overlapping telescoping arrangement, wherein the panels are slidable relative to one another such that the display device has a compact configuration and one or more extended configurations;

wherein one of the panels comprises a writing surface and the other panel comprises a corkboard; and a pair of supports configured to attach the display device to a monitor, wherein each support extends from a respective panel.

22. The display device of claim 21, wherein the writing surface comprises a whiteboard.

23. The display device of claim 21, wherein each support comprises a hinge that allows the display device to pivot between stored and operative positions relative to the monitor.

24. The display device of claim 23, wherein at least one of the hinges is configured to releasably lock the display device in an operative position.

25. The display device of claim 21, further comprising promotional indicia on at least one of the panels.

26. The display device of claim 21, further comprising a writing implement holder attached thereto.

27. The display device of claim 26, wherein the writing implement holder comprises a pair of arms extending outwardly from the display device, wherein the arms are spaced apart from each other for snugly receiving a writing implement therebetween.

28. The display device of claim 21, further comprising a writing implement removably secured within the writing implement holder.

29. The display device of claim 21, further comprising an eraser removably secured to the display device, wherein the eraser is configured to erase writing from the writing surface.

30. The display device of claim 21, wherein one of the panels comprises opposing guides extending from a rear surface thereof, and wherein the other panel is slidably secured within the guides.

* * * * *